(12) United States Patent
Hundt

(10) Patent No.: US 11,836,645 B2
(45) Date of Patent: Dec. 5, 2023

(54) GENERATING AUGMENTED SENSOR DATA FOR TESTING OPERATIONAL CAPABILITY IN DEPLOYED ENVIRONMENTS

(71) Applicant: NVIDIA Corporation, Santa Clara, CA (US)

(72) Inventor: Christian Hundt, Mainz (DE)

(73) Assignee: NVIDIA Corporation, Santa Clara, CA (US)

(*) Notice: Subject to any disclaimer, the term of this patent is extended or adjusted under 35 U.S.C. 154(b) by 692 days.

(21) Appl. No.: 16/901,369

(22) Filed: Jun. 15, 2020

(65) Prior Publication Data

US 2021/0390437 A1    Dec. 16, 2021

(51) Int. Cl.
| | | |
|---|---|---|
| *G06N 7/00* | (2023.01) | |
| *G06N 7/01* | (2023.01) | |
| *G06F 9/54* | (2006.01) | |
| *G06Q 10/0639* | (2023.01) | |

(52) U.S. Cl.
CPC ............. *G06N 7/01* (2023.01); *G06F 9/546* (2013.01); *G06Q 10/06395* (2013.01)

(58) Field of Classification Search
CPC .......... G06N 7/01; G06N 3/045; G06N 3/047; G06N 3/08; G06F 9/546
See application file for complete search history.

(56) References Cited

U.S. PATENT DOCUMENTS

| | | | | |
|---|---|---|---|---|
| 2007/0041336 A1* | 2/2007 | Wan | ...................... | H04L 67/104 370/256 |
| 2010/0286488 A1* | 11/2010 | Cohen | .................... | G16H 10/65 600/300 |
| 2012/0047378 A1* | 2/2012 | Etkin | ................. | H04W 52/0219 713/320 |
| 2017/0140631 A1* | 5/2017 | Pietrocola | ............. | G01J 1/4204 |
| 2017/0187597 A1* | 6/2017 | Nolan | ................. | H04L 43/0888 |
| 2018/0159802 A1* | 6/2018 | Bao | ...................... | H04L 49/9042 |
| 2019/0114534 A1* | 4/2019 | Teng | ........................ | G06N 3/08 |
| 2019/0384508 A1* | 12/2019 | Liu | ...................... | G06F 11/1466 |
| 2020/0409757 A1* | 12/2020 | McBride | ............... | G06F 9/5038 |

OTHER PUBLICATIONS

Nvidia Corporation. Nvidia Dali documentation. Retrieved from the internet on May 18, 2020 from URL: <https://docs.nvidia.com/deeplearning/dali/user-guide/docs/index.html>.

(Continued)

*Primary Examiner* — Tuan C Dao (74) *Attorney, Agent, or Firm* — Taylor English Duma L.L.P.

(57) ABSTRACT

In various examples, performance capabilities of a consumer—such as inference rates of a neural network executing on underlying hardware—may be tested or demonstrated for producers that have lower production rates than consumption rates of the consumer. For example, augmented data instances may be leveraged to augment production data from the producer in order to increase a frequency of transmission of data instances to a consumer. As a result, a data set including additional or alternative instances of data may be generated to emulate real-world data for demonstrating potential performance capabilities of a consuming algorithm beyond a currently required performance capability corresponding to a producer.

20 Claims, 6 Drawing Sheets

(56) References Cited

OTHER PUBLICATIONS

Apache Kafka, A distributed streaming platform, Introduction. Retrieved from the internet on May 18, 2020 from URL: <https://kafka.apache.org/intro>.
Pivotal. RabbitMQ is the most widely deployed open source message broker. Retrieved from the internet on May 18, 2020 from URL: <https://www.rabbitmq.com/>.
Singhal, Pranay. Replaying Kafka Messages—An Implementation in Golang. Jul. 24, 2019. Retrieved from the Internet on May 18, 2020 from URL: <https://medium.com/@psinghal04/replaying-kafka-messages-an-implementation-in-golang-e5c6867cf084>.
Karras, Tero et al. StyleGAN2—Official TensorFlow Implementation. Retrieved from the internet on May 18, 2020 from URL: <https://github.com/NVlabs/stylegan2>.
Wikipedia contributors. (May 15, 2020). Kalman filter. In Wikipedia, The Free Encyclopedia. Retrieved from the internet on May 18, 2020 from URL: <https://en.wikipedia.org/wiki/Kalman_filter>.

\* cited by examiner

GENERATING AUGMENTED SENSOR DATA FOR TESTING OPERATIONAL CAPABILITY IN DEPLOYED ENVIRONMENTS

BACKGROUND

Increasingly, various systems leverage outputs of sensors ("producers")—such as cameras, temperature sensors, input/output (I/O) devices, etc.—to perform various tasks using one or more machine learning models or neural networks ("consumers"). In many instances, processing capabilities of the consumers need to be tested prior to deployment in the real-world. As such, the ability to robustly and accurately test performance capabilities of the consumers may allow critical key performance indicators to be analyzed in order to optimize or model the potential functionality of the corresponding systems.

However, the processing capabilities of the consumers may differ substantially from the production capabilities of the producers generating the sensor data. For example, in certain systems or configurations, the manual or automatic generation of data—such as sensor data, image data, video data, and/or the like—can require a significantly larger amount of time relative to the inferencing time required by the corresponding consumer to process the data. As a result, the runtime performance of the consumer may be diminished, or unclear, as the consumer needs to wait for new data prior to processing. This may lead to difficulty in testing or demonstrating the true performance capabilities (e.g., peak performance) of the consumer.

In conventional systems, performance capabilities of a consumer may be determined by using a message queue that only responds to a request for input data when the sensor produces new data. In this way, when the message queue is empty of new sensor data, the message queue may perform a blocking function where the message queue may not respond to the request from the consumer until new data is available. However, where the producers produce data at a slower rate than the processing or consumption rate of the consumer, the conventional systems may artificially limit or inaccurately determine the performance capabilities of the consumer, as it is entirely dependent on the production rate of the sensor. In addition, these conventional systems fail to allow demonstration of peak performance of the consumer, thereby decreasing the likelihood of implementing the consumer in a system where the consumer may execute efficiently and effectively.

SUMMARY

Embodiments of the present disclosure relate to generating augmented sensor data instances to test inferencing consumption rates of a consumer greater than a production rate of a sensor. Systems and methods are disclosed that leverage augmented data sets to determine operational capabilities—e.g., compute, predictive, inferencing, etc.—of consumers by supplying data to the consumer even where the message queue is empty of actual sensor data instances.

In contrast to conventional systems, such as those described above, the systems and methods of the present disclosure may utilize augmented data sets generated in real-time or near real-time that account for a lack of data generated by the producer to determine peak performance of a consumer during inference. The augmented datasets may be used as a substitute for input data to the consumer when a message queue is empty of production data instances generated by the producer. For example, augmented data that corresponds to or emulates real sensor (or other production type) data—such as empty input data, previous input data, last input data, modified input data—may be generated and used as input when a message queue receives a request for new data from the producer for processing while the production data queue from the producer is currently empty. Once the augmented data and the actual production data are processed by the consumer, a peak performance metric of the consumer may be determined based on inference times corresponding to the actual production data in combination with the augmented data.

As a result, peak performance of the consumer may be determined with greater accuracy and precision using augmented data sets that overcomes any difference between the data processing capabilities of the deployed computing environment being tested and data production capabilities of the producer. As such, the process of augmenting data when a message queue is empty of actual data to test peak performance of a consumer may be comparatively more accurate, less computationally intense, more interactive, and more scalable than conventional systems, as the current system may increase the amount of available data for inferencing without being limited to actual production rates of data generated by a producer.

BRIEF DESCRIPTION OF THE DRAWINGS

The present systems and methods for generating augmented sensor data instances to test inferencing consumption rates of a consumer greater than a production rate of a sensor are described in detail below with reference to the attached drawing figures, wherein.

DETAILED DESCRIPTION

Systems and methods are disclosed related to generating augmented sensor data instances to test inferencing consumption rates of a consumer greater than a production rate of a sensor. In contrast to the conventional approaches described above, the current system provides techniques to determine performance capabilities of consumers using augmented data sets as inputs to the consumers in order to supply data to the consumer even where the message queue is empty of actual data instances. For example, augmented data that corresponds to or emulates real data—such as empty input data, previous input data, last input data, modified input data—may be generated and used as input when a message queue receives a request for new sensor data for processing while the sensor data queue from the producer is currently empty. In such embodiments, peak performance metrics of the consumer may be determined based on inference time for the augmented data set, including the actual data and the augmented data. In this way, a user of the current system provide an interactive demonstration of a peak performance functionality—e.g., for compute performance, for inferencing performance, for predictive accuracy, etc.—of the consumer even when a producer used in the demonstration is only capable of generating data at a production rate lower than the consumption rate of the consumer. As a result, an observer may understand the capabilities of the system—and the future capability of their systems—even where their current production hardware may generate data at a production rate that is less than the inferencing rate of the consumer.

With reference to testing performance capabilities of a consumer (e.g., a machine learning model, a neural network, etc.), sensor data (e.g., images, videos, depth maps, point clouds, etc.) may be received from producers (e.g., sensors, cameras, LIDAR, RADAR, temperature sensors, I/O elements, etc.) for subsequent processing by the consumer. A message queue may receive a request from the consumer for sensor data of the producer for processing. An augmented instance of sensor data may be generated by the message queue when the message queue does not have an instance of sensor data from the producer to transmit—e.g., due to the frame production rate (e.g., frame rate, update rate) of the producer being less than a frame consumption rate (e.g., frame rate, update rate) of the consumer. Peak performance metrics may be determined based on the processing time of the consumer for processing the sensor data and the augmented instances of sensor data, and/or may include accuracy or predictive performance of the consumer.

The message queue may receive sensor data from the producers and subsequently receive requests for data from the consumer. The message queue may determine that a rate of production of sensor data of a producer is lower than a rate of processing or consumption of sensor data by the consumer. In some examples, the message queue may estimate the production and consumption rate based on the number of instances of sensor data received and the number of sensor data requests received during a predetermined amount of time. In such examples, the message queue may estimate a number of instances of augmented sensor data that may be required to equate to the production rate to the consumption rate. In some embodiments, to fill in the gaps in sensor data based on a slower frame production rate of the producer, the message queue may maintain instances of augmented sensor data in a separate queue from the sensor data queue. In this way, the message queue may provide the consumer with an instance of augmented data as input data when the sensor data queue is empty and the message queue receives a request for new input data.

In some examples, the augmented sensor data substituted as input data may be an empty instance (e.g., zeros for all values, ones for all values, etc.). In such examples, the message queue may send an empty instance as input when it runs out of sensor data from the producer. This may allow the message queue to provide input data in real-time or near real-time without using much compute power. In some embodiments, the augmented sensor data may correspond to a resampled instance of sensor data previously generated by the producer. In such examples, the message queue may select a previous instance of sensor data based on a probability distribution analysis of the previous instances of sensor data encountered by the message queue (e.g., where the sensor data is representative of images of animals, and a cat is the present most often, the selected instance may be an instance with a cat). The resampled instance of sensor data may also be sampled from only a portion of the previous instances of sensor data that are within a predetermined threshold number of previous instances. In yet other examples, the augmented sensor data may be a replay of the most recent instance of sensor data generated by the producer. In this way, the message queue may assume that the most recent instance of sensor data may more accurately represent expected sensor data at this instance of time.

In other examples, the message queue may generate a modified version of a prior instance of the sensor data as the augmented sensor data. In such examples, the augmented sensor data may represent a possible instance of input data determined based on analyzing one or more prior instances from the producer. As such, an instance of real sensor data may be augmented or transformed (e.g., rotated, mirrored, zoomed, cropped, have pixel values changed, etc.) such that it represents sensor data from an equivalent sensor. For example, a mirror image, a rotated image, a zoomed-in or zoomed-out image, a transformed image (e.g., using a view port transformation), and/or another type of augmentation or transformation of an original image may be used as augmented image. In another example, an optical flow analysis may be performed by the message queue to predict a next instance of sensor data based on the previous instances, and the predicted next instance may be generated. In some embodiments, a generative adversarial network (GAN) may be used to generate a predicted instance of the sensor data. For example, predictive performance of a consumer may be increased and/or measured using the GAN that samples from the distribution of observed data points that the consumer is consuming. In any example, the augmented or transformed instance may be used as input for the consumer to test, sample, or observe a processing frame consumption rate of the consumer for peak performance testing, presentation, or observation.

Figure 1:
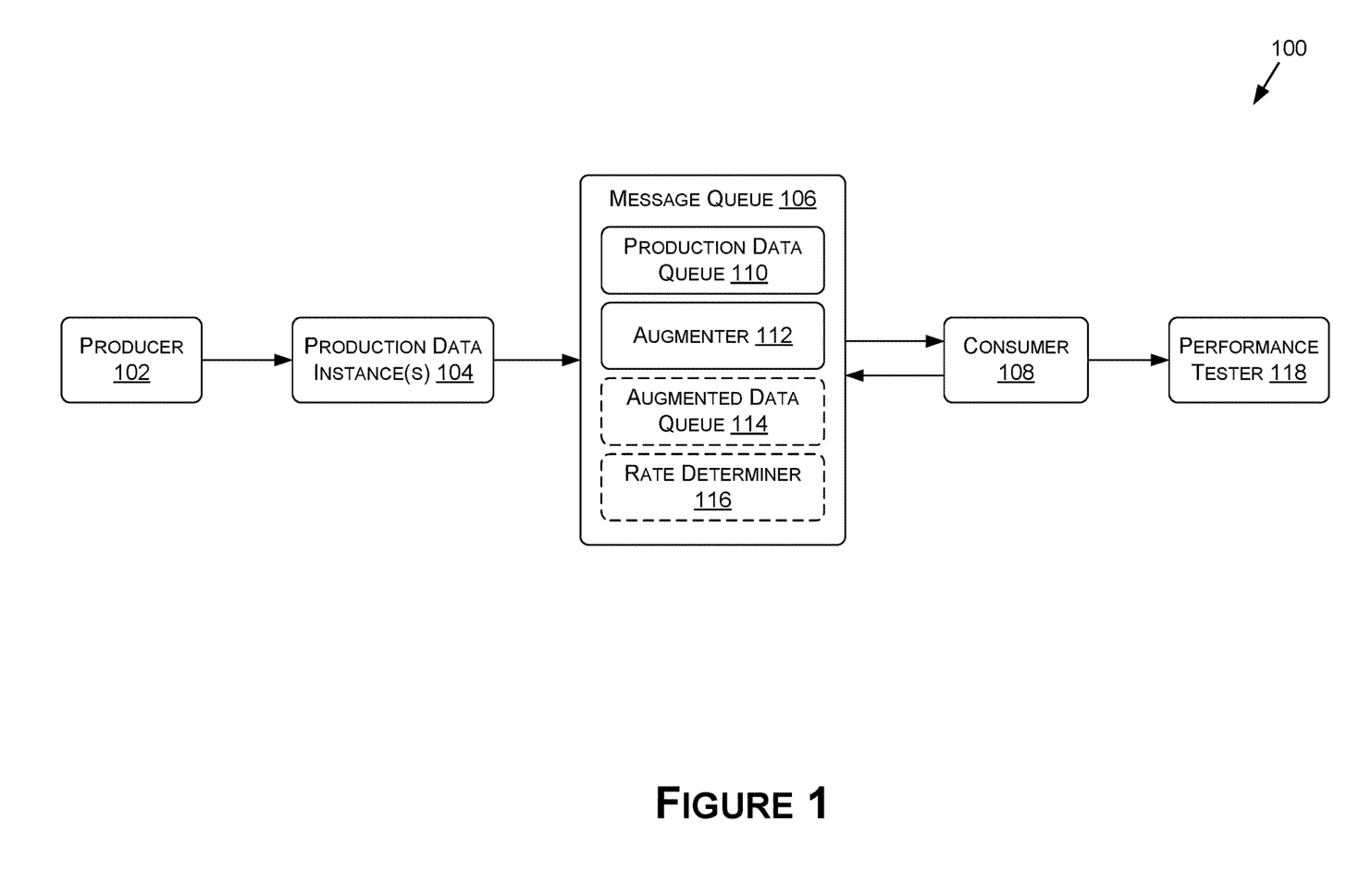
FIG. 1 is an example data flow diagram illustrating an example process for generating augmented data instances for testing performance capabilities of a consumer, in accordance with some embodiments of the present disclosure.

With reference to FIG. 1, FIG. 1 is an example data flow diagram illustrating an example process 100 for generating augmented data instances for testing performance capabilities of a consumer, in accordance with some embodiments of the present disclosure, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In addition, in some embodiments, additional and/or alternative features, functionality, and/or components may be used within the process 100 other than those described herein without departing from the scope of the present disclosure.

The process 100 may include generating and/or receiving production data instances 104 from producer 102. The producer 102 may be a sensor configured to generate sensor data instances, such as production data instances 104 at a production rate (e.g., frame rate, update rate). The production data instances 104 may be sensor data instances generated by and/or received from, as a non-limited example, one or more producers (e.g., producer 102, producers 102A-102C of FIG. 2, as described herein). The producer 102 may be configured to generate production data instances 104 at a production rate (e.g., 30 frames per second (fps), 25 fps, 20 fps, etc.). The production data instances 104—in addition to augmented data instances—may be used by a consumer(s) 104, and within the process 100, to test the performance capabilities of the consumer(s) (e.g., consuming algorithms associated therewith). For example, the production data instances 104 may include, without limitation, instances of sensor data generated by one or more real and/or virtual (e.g., within a virtual environment) sensors. Where the producer 102 is virtual, the virtual sensor or producer 102 may correspond to a virtual system in a simulated environment (e.g., used for testing, training, and/or validating neural network performance), and the virtual sensor data may represent sensor data captured by the virtual sensors within the simulated or virtual environment.

The production data instances 104 may include sensor data instances—e.g., recorded or actual instances of the sensor data that may be representative of an image, a depth map, a point cloud, a temperature reading, a pressure reading, an audio clip, and/or another sensor data representation—recorded by a producer 102 (e.g., sensor). The production data instances 104 may include, without limitation, sensor data from any producer 102, for example, a sensor, a camera (e.g., stereo camera, wide-view camera, infrared camera, surround camera, long-range camera, mid-range camera), a LIDAR sensor, a RADAR sensor, a temperature sensor, an I/O element, a pressure sensor, an ultrasonic sensor, etc. It should be noted that the producer 102 may be any sensor or producer type configured to generate production data instances 104 for processing by a consumer 108 (e.g., a consuming algorithm) of the present system.

In some embodiments, the production data instances 104 may correspond to image data representing an image(s), image data representing a video (e.g., snapshots of video), sensor data representing sensory fields of sensors (e.g., depth maps or point clouds for LIDAR sensors, a value graph for ultrasonic sensors, etc.), sensor data representing outputs (e.g., voltages, currents, etc.) of sensors as a result of inputs (e.g., audio inputs to a microphone, touch inputs to a touch screen, other input types (e.g., to a keyboard, a mouse, a controller, etc.), and/or other outputs of producers. With respect to the production data instances 104 that correspond to image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the production data instances 104 may be used within the process 100 without any pre-processing (e.g., in a raw or captured format), while in other examples, the production data instances 104 may undergo pre-processing (e.g., noise balancing, demosaicing, scaling, cropping, augmentation, white balancing, tone curve adjustment, etc., such as using a sensor data pre-processor (not shown)). As used herein, the production data instances 104 may reference unprocessed data, pre-processed data, or a combination thereof. The production data instances 104 may include original images (e.g., as captured by one or more image sensors), down-sampled images, up-sampled images, cropped or region of interest (ROI) images, otherwise augmented images, and/or a combination thereof.

The process 100 may include a message queue 106 that receives the production data instances 104 from the producer(s) 102, manages the transmission of the production data instances 104 and/or augmented data instances to the consumer 108 (e.g., in response to requests from the consumer 108), and/or manages generation of the augmented data instances. For example, using one or more inputs, the message queue 106 may generate augmented data instances and/or populate an augmented data queue 114 corresponding thereto. The augmented data instances (e.g., via the augmented data queue 114) may include one or more instances of sensor data to fill in gaps in the production data instances 104 (e.g., as stored in the production data queue 110) based on a production rate of the producer 102 being less than a consumption rate of the consumer 108 for testing—or meeting—the performance capabilities (e.g., peak performance) of the consumer 108.

The message queue 106 may be used as a relay—e.g., to manage communications—between and among the producer 102 and the consumer 104. The message queue 106 may receive the production data instances 104 and store the production data instances 104 in the production data queue 110 (e.g., in the order the production data instances 104 are received). Further, the message queue 106 may be configured to receive request(s) from the consumer 108 for production data instances 104 from the producer 102 for processing.

The consumer 108 may correspond to one or more consumption algorithms—such as a machine learning model, a neural network, a feature-based algorithm, a computer vision algorithm, and/or the like—configured to process the production data instances 104 as inputs and generate outputs. For example, the production data instances 104 and/or the augmented data instances may be applied to the consumer 108 to generate outputs (e.g., corresponding to classifications, object detections, audio-to-text, etc.). The consumption algorithm of the consumer 108 may be trained to determine any type and number of outputs from the input data instances. The inferencing time (e.g., processing time) of the consumer 108 may be used by a performance tester 118 to determine and/or demonstrate performance capabilities (e.g., performance metrics, peak performance) of the consumer 108—even where the production rate of the consumer 102 is less than the consumption rate of the consumer 108.

Although examples are described herein with respect to using deep neural networks (DNNs) as the consuming algorithm corresponding to the consumer 108, this is not intended to be limiting. For example, and without limitation, the consumer 108 may include any type of consumption algorithm, such as a consumption algorithm using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), lane detection algorithms, computer vision algorithms, and/or other types of consumption algorithms.

As an example, such as where the consumer 108 includes a convolutional neural network (CNN), the CNN may include any number of layers. One or more of the layers may include an input layer. The input layer may hold values associated with the production data instances 104 and/or augmented data instances (e.g., before or after post-processing). For example, when the production data instances 104 and/or augmented data instances correspond to an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the consumer 108, and some or all of the convolutional streams may include a respective fully connected layer(s).

In some non-limiting embodiments, the consumption algorithm of the consumer 108 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the consumption algorithm of the consumer 108, this is not intended to be limiting. For example, additional or alternative layers may be used, such as normalization layers, SoftMax layers, and/or other layer types.

In embodiments where the consumption algorithm of the consumer 108 includes a CNN, different orders and numbers of the layers of the CNN may be used depending on the embodiment. As such, the order and number of layers is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the consumption algorithm of the consumer 108 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Further, the consumer 108 may include, in addition to a consumption algorithm(s), underlying hardware that enables—in addition to the underlying software—the consumption algorithm(s) to execute at the consumption rate. For example, the consumer 108 may include one or more parallel processing units, one or more GPU(s), one or more accelerators (e.g., deep learning accelerators), and/or other hardware—in addition to a CPU(s), memory, etc.—that may aid in increasing the consumption rate.

In embodiments, the consumer 108 may be included in a deployed computing environment for executing inferencing tasks, and the consumer 108 may include one or more consumption algorithms executing on underlying hardware of the consumer 108. In such embodiments, the consumption rate 108 of the consumer may correspond to an inferencing rate at which data instances can be processed through the consumption algorithm. As such, the underlying algorithms and hardware of the consumer 108 may enable the inferencing rate of the consumer 108. In such an example, the producer 102 may generate the production data instances 104 for processing, and because the production rate of the producer 102 may be less than the inferencing rate of the consumer 108, the message queue 106 may generate additional, augmented data instances to demonstrate or test the actual consumption (or inferencing) rate of the consumer 108. For example, to demonstrate inferencing capabilities (e.g., in the cloud, at the edge, etc.) of a provider (e.g., a first company) for a customer (e.g., a second company), the provider may leverage production data instances 104 of a producer 102 of the customer in addition to augmented data instances from the message queue 106 to demonstrate the potential inferencing capabilities of the provider for the customer. This may provide incentive to the customer to use the consumer 108 of the provider knowing that the consumer 108 may scale as the producer 102 of the customer increases its production rate.

In other embodiments, the consumer 108 may be included in a storage implementation, and the consumer 108 may include one or more storage devices of a data center, for example. In such embodiments, the consumption rate 108 of the consumer may correspond to the rate at which data can be read and/or written from memory. As such, the underlying algorithms and hardware of the consumer 108 may enable the read/write rate of the consumer 108. In such an example, the producer 102 may generate the production data instances 104 for storage, and because the production rate of the producer 102 may be less than the write rate of the consumer 108, the message queue 106 may generate additional, augmented data instances to demonstrate or test the actual consumption rate (e.g., read rate, write rate, etc.) of the consumer 108. For example, to demonstrate cloud storage capabilities of a provider (e.g., a first company) for a customer (e.g., a second company), the provider may use production data instances 104 of a producer 102 of the customer in addition to augmented data instances from the message queue 106 to demonstrate the potential cloud storage capabilities of the provider for the customer. This may provide incentive to the customer to use the consumer 108 of the provider knowing that the consumer 108 may scale as the producer 102 of the customer increases its production rate.

Referring again to the message queue 106, the message queue 106 may receive requests for sensor data instances (e.g., production data instances 104) from the consumer 108.

The consumer 108 may have a consumption rate (e.g., inferencing rate, frame rate, update rate, storage rate, read/write rate, etc.) that is higher than the production rate of the producer 102. The consumer 108 may send one or more requests for production data instances 104 to the message queue 106 for processing at the consumption rate. The consumption rate may indicate a rate at which the consumer 108 consumes or processes data instances. In some embodiments, the consumer 108 may send requests for new production data instances 104 according to the consumption rate and/or when the consumer 108 runs out of data to process.

In response to requests, or otherwise at some determined interval, the message queue 106 may transmit, send, and/or provide instances of data (e.g., production data instances 104, augmented data instances, etc.) to the consumer 108 for processing. For example, upon receiving a consumption request from the consumer 108, the message queue 106 may determine whether a production data instance 104 is available in the production data queue 110. When a production data instance(s) 104 is available in the production data queue 110, the message queue 106 may send or transmit the production data instance(s) 104 to the consumer 108 for processing in response to the corresponding consumption request.

When the production data queue 110 is empty of new production data instances 104, the message queue 106 may generate an augmented data instance(s) using an augmenter 112 for input to the consumer 108 and/or may retrieve a previously generated augmented data instance from an augmented data queue 114. In some examples, the augmenter 112 may utilize an empty augmentation algorithm (e.g., empty augmenter 112A of FIG. 3) to generate the augmented data instance(s). In such examples, the augmenter 112 may generate an empty instance(s) (e.g., zero for all values, ones for all values, random values for all values, etc.) to be input as a data instance to the consumer 108 for processing. In this way, the message queue 106 may send as input, an empty instance, when the production data queue 110 runs out of production data instances 104 (e.g., actual sensor data). The consumer 108 may process the empty instance as if it were an actual production data instance 104, allowing the message queue 106 to provide input data to the consumer 108 in real-time or near real-time without requiring much compute power.

In another example, the augmenter 112 may utilize a resampling augmentation algorithm (e.g., resample augmenter 112B of FIG. 3) to generate the augmented data instances. In such examples, the augmenter 112 may resample a production data instance 104 previously generated by the producer and subsequently encountered by the message queue 106 in a previous iteration of the augmented data instance(s). In such an example, the message queue 106 may select a previous production data instance 104 based on a probability distribution analysis of the previous instances of the production data encountered by the message queue 106. Any known probability distribution analysis (e.g., normal distribution, binomial distribution, multinomial distribution, etc.) may be used to select the augmented data instances from the previous production data instances 104. In some instances, previous production data instances 104 may be sampled in a stratified manner. For example, where the production data queue 110 includes production data instances 104 representative of images of animals, and a cat is encountered the most often, the selected production data instance 104 to be used as the augmented data instances may be an image of a cat from the previously encountered cat images in the production data queue 110. In some embodiments, the resampled instance of production data instances 104 may also be sampled from only a portion of the previously encountered instances that are within a predetermined threshold number of instances (e.g., the last 10 instances). In this way, the message queue 106 may send as input, a resampled or previously encountered instance when the production data queue 110 runs out of production data instances 104 (e.g., actual sensor data). The consumer 108 may process the resampled instance as if it were an actual new production data instances 104, allowing the message queue 106 to provide input data to the consumer 108 in real-time or near real-time without requiring much compute power since it reuses a previous instance.

In yet another example, the augmenter 112 may utilize an identity augmentation algorithm (e.g., identity augmenter 112B of FIG. 3) to generate the augmented data instances. In such examples, the augmenter 112 may replay the most recent instance of the production data instances 104 encountered by the production data queue 110 as the augmented data instances to input to the consumer 108. In such an example, the message queue 106 may select the last production data instances 104 to send to the consumer 108 in response to a consumption request when the production data queue 110 is empty. In this way, the message queue 106 may send as input, a last instance when the production data queue 110 runs out of production data instances 104 (e.g., actual sensor data). The consumer 108 may process the last instance as if it were an actual new production data instances 104, allowing the message queue 106 to provide input data to the consumer 108 in real-time or near real-time without requiring much compute power since it reuses the last instance stored in memory.

In some examples, the augmenter 112 may utilize a transforming algorithm (e.g., transformer 112D of FIG. 3) to generate the augmented data instances to send to the consumer 108 for processing. In such examples, the augmenter 112 may generate a transformed version of a previous instance of the production data instances 104 in the production data queue 110. The augmenter 112 may generate a possible or likely instance of data by analyzing one or more previous instances of the production data instances 104 encountered by the message queue 106. For example, the augmenter 112 may select a previous production data instance(s) 104 for transforming based on a probability distribution analysis of the previous instance(s) of the production data encountered by the message queue 106. Any known probability distribution analysis may be used to select the instance for transformation from the previous production data instance(s) 104. Further, the instance of production data instances 104 for transformation may also be selected from only a portion of the previously encountered instances that are within a predetermined threshold number of instances (e.g., last 10).

The augmenter 112 may apply an augmentation or transformation algorithm—such as rotation, mirroring, moving, zooming in, zooming out, etc.—to generate the augmented data instances such that the instances more closely represent the production data instances 104 from an equivalent producer. For example, for a producer 102 generating images, the augmenter 112 may use a mirror image, a rotated image, a zoomed-in image, a zoomed-out image, a transformed image (e.g., using a view port transformation), and/or any other type of augmentation or transformation of a selected original image to generate the augmented data instances to send to the consumer 108 for processing in response to a consumption request when the production data queue 110 is empty.

In another example, the augmenter 112 may perform an optical flow analysis to predict a next instance of the production data based on the previous instances of the production data instances encountered by the message queue 106 in the production data queue 110. Any known optical flow analysis may be used to predict the next instance. In any example, the augmenter 112 may provide the augmented data instances as input to the consumer 108 to test, sample, and/or observe a consumption rate (e.g., processing rate, frame rate, inference rate, update rate, etc.) of the consumer 108 for peak performance testing, demonstration, and/or observation.

The message queue 106, in some examples, may also include an augmented data queue 114 and/or a rate determiner 116. In such examples, the rate determiner 116 may determine a rate of production of the producer 102, a rate of consumption of the consumer 108, and/or a difference in the rates of the producer 102 and the consumer 108. In some examples, the rate determiner 116 may estimate—e.g., once, periodically, at an interval, etc.—the production and consumption rates of the producer 102 and the consumer 108, respectively, based on comparing the number of production data instances 104 from the producer 102 and/or the number of consumption data requests from the consumer 108 received by the message queue 106 in a predetermined amount of time (e.g., 1 second, 5 seconds, 10 seconds, 60 seconds, etc.). In such examples, the message queue 106 may determine the number of augmented data instances that may be required to align or substantially align the production rate of the producer 102 to the consumption rate of the consumer 108. In order to fill in the gaps in the data based on the slower production rate of the producer 102, the message queue 106 may maintain a set of augmented data instances in the augmented data queue 114—e.g., separate from the production data queue 110, in embodiments—based on the determined number of augmented data instances required to fill in the gap. Each augmented data instance of the augmented data instances in the augmented data queue 114 may be generated by the augmenter 112. In this way, the message queue 106 may provide the consumer 108 with augmented data instances in the augmented data queue 114 when the production data queue 110 is empty and the message queue receive a request for new input data. In some embodiments, the production data queue 110 and/or the augmented data queue 114 may include a rolling buffer that stores a set amount of data instances.

In some embodiments, as described herein, the augmenter 112 may generate augmented data instances when it is determined that the production data queue 110 is empty (and may not maintain or populate the augmented data queue 114). As such, in response to a request from the consumer 108, the message queue 106 may determine there are no production data instances 104 available—e.g., no instances in the production data queue 110—and may generate an augmented data instance using the augmenter 112 and transmit the same to the consumer 108 for processing.

A performance tester 118 may be utilized to determine performance metrics of the consumer 108 based on the processing time of the consumer 108 for processing the production data instances 102 and/or the augmented data instances. In some examples, the performance tester 118 may determine the processing time of the consumer 108 based on a total number of instances of the production data instances 102 and the augmented data instances processed or consumed by the consumer 108 in a predetermined amount of time. In some other examples, the performance tester 118 may determine the processing time of the consumer 108 based on a total amount of time taken by the consumer 108 to process or consume a predetermined number of instances—e.g., including both production data instances 102 and the augmented data instances. Any number and type of peak performance capabilities of the consumer 108 may be determined by the performance tester 118 by testing, sampling, and/or observing a consumption rate (e.g., processing rate, frame rate, inference rate, update rate, etc.) of the consumer 108 for peak performance testing, demonstration, presentation, and/or observation. In this way, performance capabilities of the consumer 108 may be determined accurately in real-time or near real-time without requiring a producer that has a production rate that matches or exceeds the consumption rate of the consumer 108. For example, a potential customer may be shown the true performance capabilities (e.g., peak performance) of the consumer 108 in real-time, allowing the customer to either select another producer 102 based on the possible and/or the desired production rate, and/or to understand the future processing capabilities of the consumer 108 for scaling as performance of the producer 102 of the customer improves.

Figure 2:
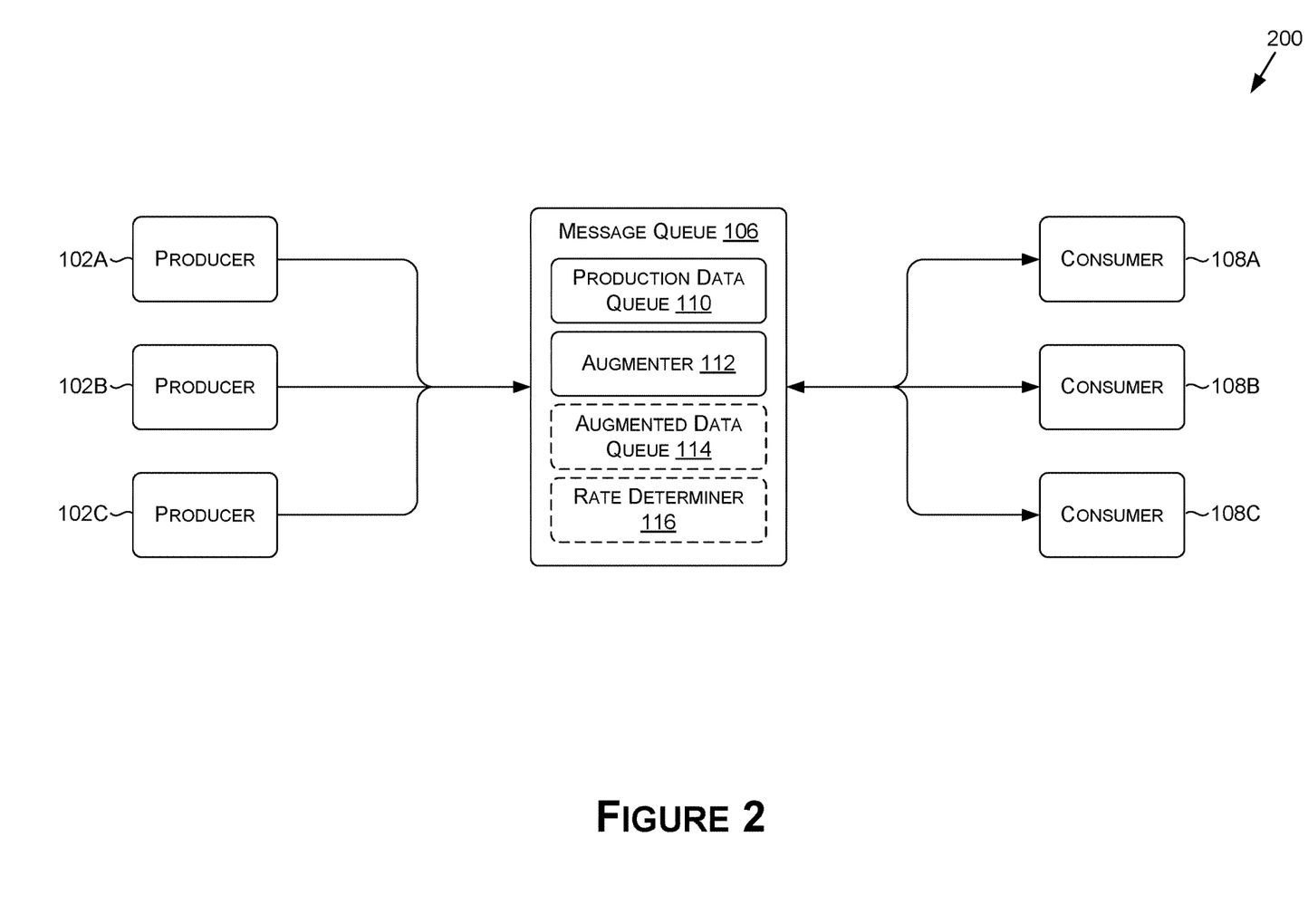
FIG. 2 is an example system illustrating an architecture for a message queue serving multiple producers and multiple consumers, in accordance with some embodiments of the present disclosure.

Now referring to FIG. 2, FIG. 2 is example system 200 illustrating an example architecture for a message queue 106 serving multiple producers and multiple consumers, in accordance with some embodiments of the present disclosure. In some examples, exchanges between more than one producer 102 and/or more than one consumer 108 may be managed by the message queue 106. For example, the message queue 106 may receive production data instances 104 from each of producers 102A, 102B, and 102C. The message queue 106 may also receive consumption data requests from and provide production data instances and augmented data instances to each of the consumers 108A, 108B, and 108C. In some examples, the message queue 106 may simultaneously perform separate augmentation for each pair of producer and consumer. In other examples, the message queue 106 may provide production data instances and augmentation data instances from any one producer to any one consumer based on what instances are available when a consumer requests new data for processing. In this way, the message queue 106 may allow the consumers 108A-108C to be tested or observed simultaneously, and/or may demonstrate the capabilities of a system—e.g., including more than one producer 102 and requiring more than one consumer 108—using the consumers 108A-108C.

For example, where the producers 102A-102C correspond to sensors of an autonomous vehicle of a customer, and the consumers 108A-108C correspond to DNNs executing on an underlying hardware platform of a provider, the message queue 106 may be used to demonstrate the inferencing capabilities of the consumers 108A-108C even where the production rates of the producers 102A-102C does not currently match the consumption or inferencing rate of the consumers 108A-108C. As such, where a production rate (or frame rate) of the producers 102A-102C is 30 fps, and the consumption rate of the consumers 108A-108C is 60 fps, the message queue 106 may generate an additional 30 augmented data instances each second to demonstrate the inferencing capabilities of the consumers 108A-108C.

In some embodiments, more than one producer 102A-102C may be used to generate an aggregated or pooled set of production data 104 for one or more of the consumers 108A-108C—e.g., such that augmented data instances may not be required in some instances. In some examples, production data instances 104 from two or more of the producers 102A-102C may be fused to create a new signal type that may be processed and/or used to train or test inferencing capabilities of a consumer 108. For example, where a first producer is a camera and another is a LIDAR sensor, the two signals may be combined or fused to generate a colored point cloud. This may be accomplished by, for example, mapping inputs x1, x2, x3, etc. by a function $f(x1, x2, x3)$.

Figure 3:
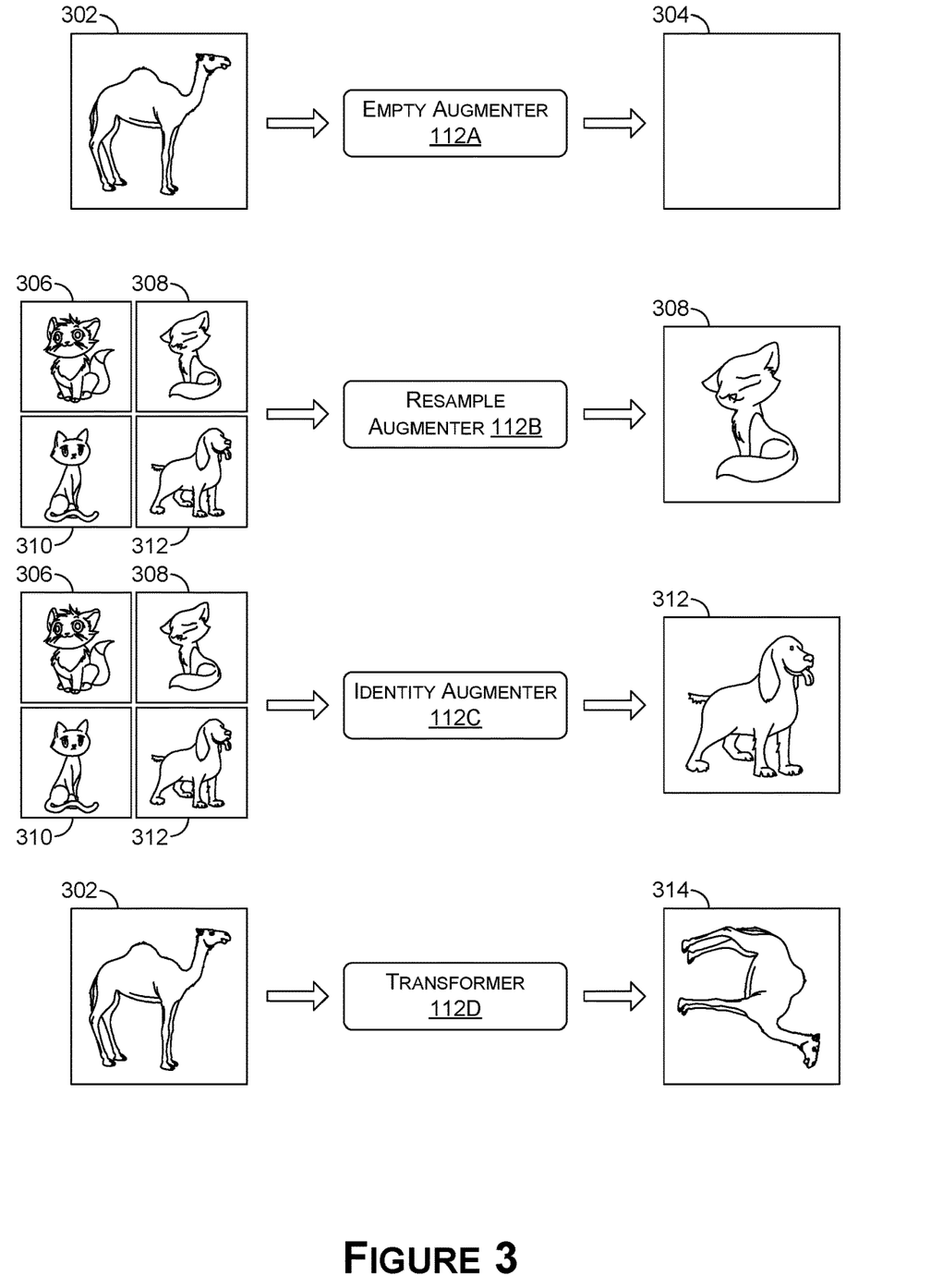
FIG. 3 depicts example illustrations of augmented data instances generated by a message queue, in accordance with some embodiments of the present disclosure.

Referring now to FIG. 3, FIG. 3 illustrates augmented data instances generated by an augmenter 112, in accordance with some embodiments of the present disclosure. The augmenter 112 may generate an augmented data instance when the production data queue is empty and a request for sensor data or production data is received. For example, an empty augmenter 112A may generate an empty instance 304 (e.g., zero for all values) when the production data queue is empty, even when a previous instance 302 of the production data instances 104 is not an empty instance. This allows the consumer 108 to process an instance even when the queue is empty.

As another example, a resample augmenter 112B may resample a previous instance 308 of production data instances (e.g., instances 306, 308, 310, and 312) as the augmented data instance to input into the consumer 108 when the production data queue is empty of instances. As described above with respect to FIG. 1, the resample augmenter 112B may perform a probability distribution analysis on the previously encountered instances, instances 306, 208, 310, and 312, to predict a most likely instance to use as the augmented data instance 308. In this way, a previously encountered instance may be resampled to provide to the consumer 108.

For another example, an identity augmenter 112C may select a last instance 312 encountered by the message queue 106 as the augmented data instance for input to the consumer 108 when the message queue 106 is empty of new instances. For example, the identity augmenter 112C may re-use the last instance 312 in a production data queue 110 as the augmented data instance as an assumption that the last instance 312 is the most likely, or most similar instance to what the instance could have been if a new instance was received from the producer. In this way, the message queue may respond to the consumer in real-time or near real-time even when no new instance is present in the message queue 106.

In other examples, a transformer 112D may transform or augment a previous instance 302 encountered by the message queue as the augmented data instance 314 for inputting into the consumer when the message queue 106 is empty of new instances. For example, the transformer 112D may rotate a previously encountered data instance 302 to generate the augmented data instance 314. In examples, the transformer 112D may select a previous instance 302 to transform or augment by performing a probability distribution analysis on some or all of the previous instances of data encountered by the message queue.

Figure 4:
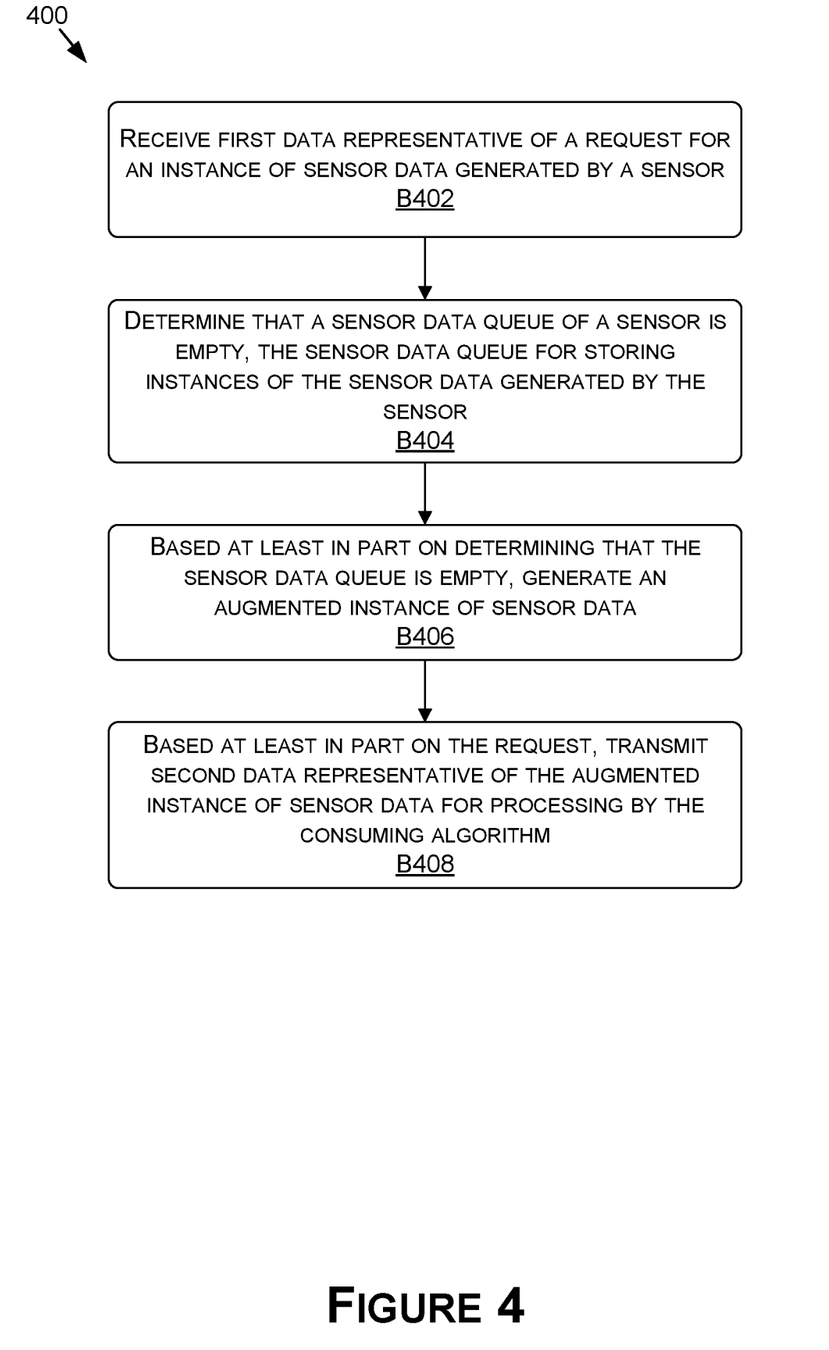
FIGS. 4-5 include flow diagrams illustrating example processes for determining peak performance of a consuming algorithm, in accordance with some embodiments of the present disclosure.
Figure 5:
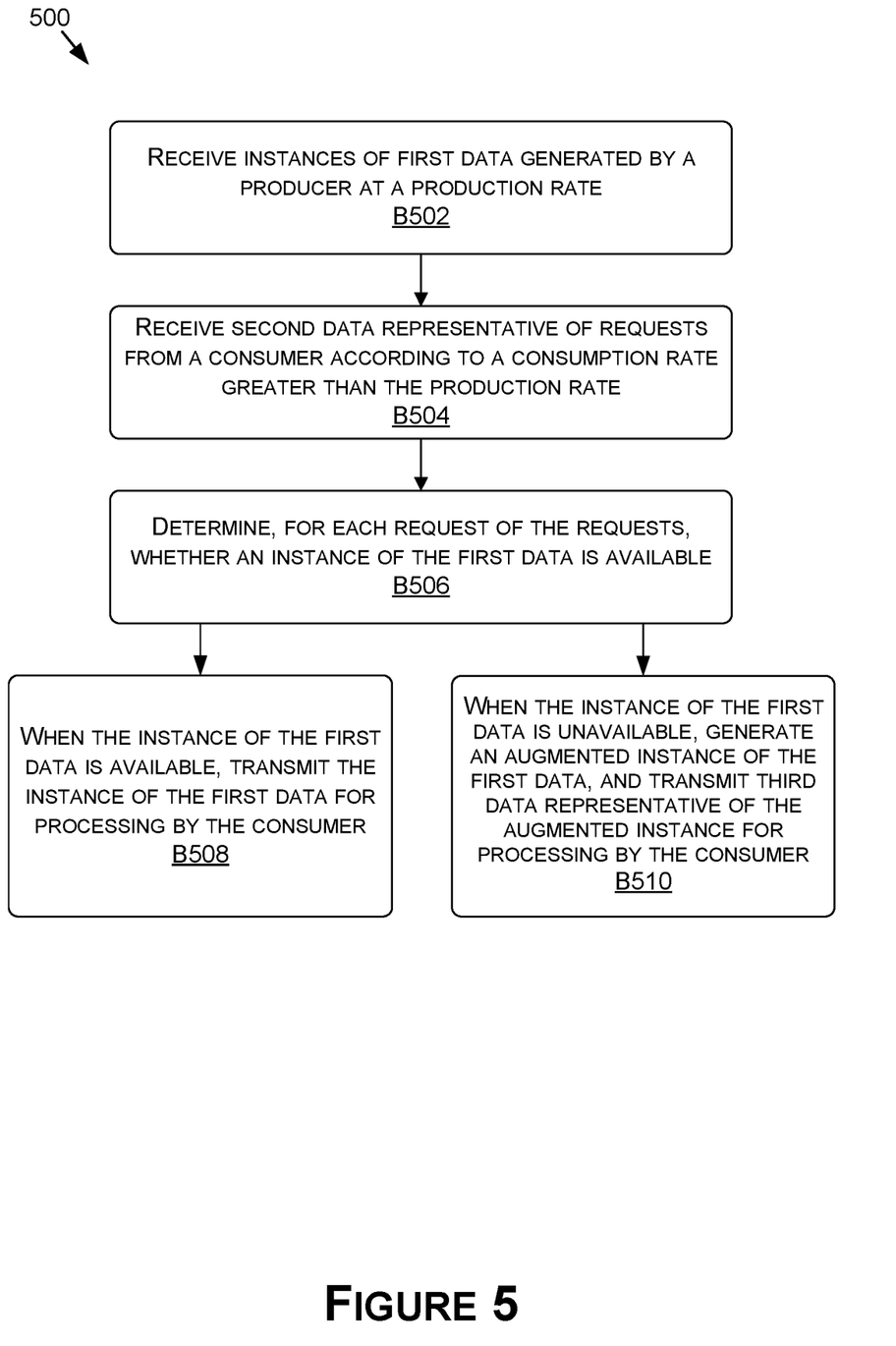

Now referring to FIGS. 4 and 5, each block of methods 400 and 500, described herein, comprises a computing process that may be performed using any combination of hardware, firmware, and/or software. For instance, various functions may be carried out by a processor executing instructions stored in memory. The methods 400 and 500 may also be embodied as computer-usable instructions stored on computer storage media. The methods 400 and 500 may be provided by a standalone application, a service or hosted service (standalone or in combination with another hosted service), or a plug-in to another product, to name a few. In addition, methods 400 and 500 are described, by way of example, with respect to the process of FIG. 1. However, these methods 400 and 500 may additionally or alternatively be executed by any one system within any one process, or any combination of systems and processes, including, but not limited to, those described herein.

FIG. 4 is a flow diagram showing a method 400 for determining peak performance of a consuming algorithm, in accordance with some embodiments of the present disclosure. The method 400, at block B402, includes receiving first data representative of a request for an instance of sensor data generated by a sensor. For example, the message queue 106 may receive first data representative of a request from the consumer 108 for an instance of sensor data generated by the producer 102.

The method 400, at block B404, includes determining that a sensor data queue of a sensor is empty, the sensor data queue for storing instances of the sensor data generated by the sensor. For example, the message queue 106 may determine that the production data queue 110 for storing production data instances 104 generated by the sensor 102 is empty.

The method 400, at block B406, includes, based at least in part on determining that the sensor data queue is empty, generating an augmented instance of sensor data. For example, the augmenter 112 may generate an augmented instance of sensor data based at least in part on determining that the production data queue 110 is empty.

The method 400, at block B408, includes, based at least in part on the request, transmitting second data representative of the augmented instance of sensor data for processing by the consuming algorithm. For example, based at least in part on the request from the consumer 108, the message queue 106 may transmit data representative of the augmented instance of sensor data generated by the augmenter 112 for processing by the consumer 108.

Now referring to FIG. 5, FIG. 5 is a flow diagram showing a method 500 for determining peak performance of a consuming algorithm, in accordance with some embodiments of the present disclosure. The method 500, at block B502, includes receiving instances of first data generated by a producer at a production rate. For example, the message queue 106 may receive production data instances 104 generated by the producer 102 at a production rate.

The method 500, at block B504, includes receiving second data representative of requests from a consumer according to a consumption rate greater than the production rate. For example, the message queue 106 may receive data representative of requests from the consumer 108 according to a consumption rate greater than the production rate of the producer 102.

The method 500, at block B506, includes determining, for each request of the requests, whether an instance of the first data is available. For example, the message queue 106 may determine, for each request of the requests from the consumer 108, whether a production data instance 104 is available in the production data queue 110.

The method 500, at block B508, includes transmitting the instance of the first data for processing by the consumer when the instance of the first data is available. For example, when the production data instance 104 is available in the production data queue 110, the message queue 106 may transmit data representative of the production data instance 104 to the consumer 108 for processing.

The method 500, at block B510, includes generating an augmented instance of the first data, and transmitting third data representative of the augmented instance for processing by the consumer when the instance of the first data is unavailable. For example, when the production data instance 104 is unavailable, an augmented instance may be generated by the augmenter 112 and data representative of the augmented instance may be transmitted to the consumer 108 for processing.

Example Computing Device

Figure 6:
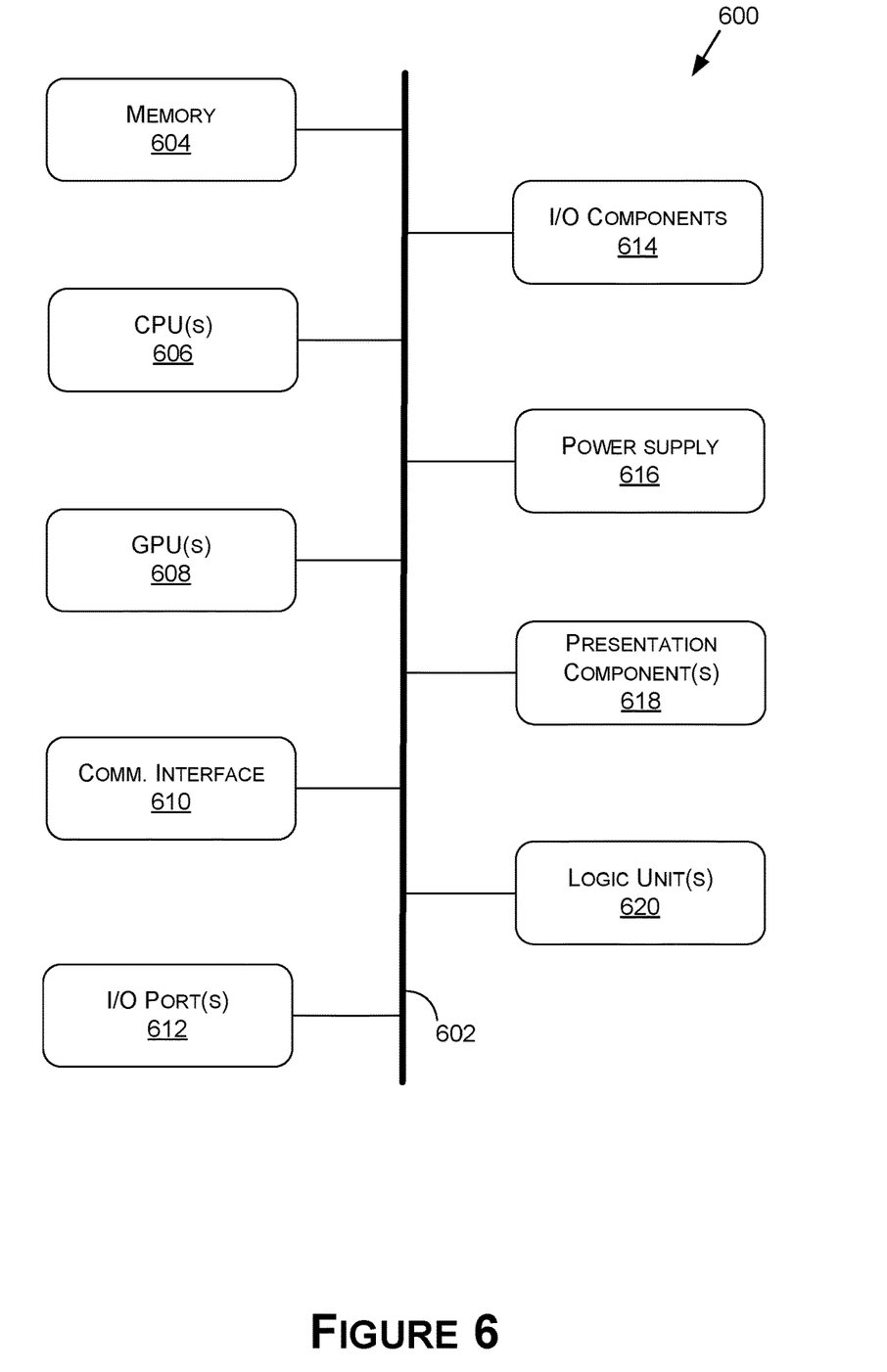
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving first data representative of a request for an instance of sensor data generated using a sensor;
determining that a sensor data queue of an inferencing application executed using a deployed computing environment is empty, the sensor data queue for storing instances of the sensor data generated using the sensor;
based at least on the determining that the sensor data queue is empty, generating an augmented instance of the sensor data; and
based at least on the request, transmitting second data representative of the augmented instance of the sensor data for storage using the sensor data queue, the second data for processing using the inferencing application as the instance of the sensor data generated using the sensor.

2. The method of claim 1, wherein the generating the augmented instance of the sensor data comprises generating the augmented instance with all values set to a same value.

3. The method of claim 1, wherein the generating the augmented instance of the sensor data comprises selecting the augmented instance of the sensor data from a previous instance of the sensor data generated using the sensor.

4. The method of claim 1, wherein the generating the augmented instance of the sensor data comprises selecting the augmented instance of the sensor data from a previous instance of the sensor data generated using the sensor, the selecting being based at least on a probability distribution analysis of a plurality of previous instances of the sensor data.

5. The method of claim 1, wherein the generating the augmented instance of the sensor data comprises replaying a most recent instance of the sensor data generated using the sensor.

6. The method of claim 1, wherein the generating the augmented instance of the sensor data comprises transforming a prior instance of the sensor data generated using the sensor.

7. The method of claim 1, wherein the generating the augmented instance of the sensor data comprises predicting a next instance of the sensor data based at least on an optical flow analysis of previous instances of the sensor data generated using the sensor.

8. The method of claim 1, further comprising:
monitoring a volume of the sensor data in the sensor data queue; and
repeating the generating the augmented instance of the sensor data and the transmitting the second data until the volume of the sensor data exceeds a threshold volume of data.

9. A system comprising:
one or more processing units to:
receive first data representative of a request for an instance of sensor data generated using a sensor;
determine that a sensor data queue of an inferencing application executed using a deployed computing environment is empty, the sensor data queue for storing instances of the sensor data generated using the sensor;
based at least on the sensor data queue being empty, generate an augmented instance of the sensor data; and
based at least on the request, transmit second data representative of the augmented instance of the sensor data for storage using the sensor data queue, the second data for processing using the inferencing application as the instance of the sensor data generated using the sensor.

10. The system of claim 9, wherein the generation of the augmented instance of the sensor data comprises generating the augmented instance with all values set to a same value.

11. The system of claim 9, wherein the generation of the augmented instance of the sensor data comprises selecting the augmented instance of the sensor data from a previous instance of the sensor data generated using the sensor.

12. The system of claim 9, wherein the generation of the augmented instance of the sensor data comprises selecting the augmented instance of the sensor data from a previous instance of the sensor data generated using the sensor, the selecting being based at least on a probability distribution analysis of a plurality of previous instances of the sensor data.

13. The system of claim 9, wherein the generation of the augmented instance of the sensor data comprises replaying a most recent instance of the sensor data generated using the sensor.

14. The system of claim 9, wherein the generation of the augmented instance of the sensor data comprises transforming a prior instance of the sensor data generated using the sensor.

15. The system of claim 9, wherein the generation of the augmented instance of the sensor data comprises predicting a next instance of the sensor data based at least on an optical flow analysis of previous instances of the sensor data generated using the sensor.

16. The system of claim 9, wherein the one or more processing units are further to:
monitor a volume of the sensor data in the sensor data queue; and
repeat the generation of the augmented instance of the sensor data and the transmission of the second data until the volume of the sensor data exceeds a threshold volume of data.

17. The system of claim 9, wherein the system is comprised in at least one of:
a control system for an autonomous machine;
a system for performing simulation operations;
a system for generating or presenting at least one of virtual reality content or augmented reality content;
a system for performing deep learning operations;
a system incorporating one or more virtual machines (VMs);
a system implemented at least partially in a data center;
a system implemented at least partially using cloud computing resources; or
a system for testing inferencing capability of a deployed computing environment.

18. A processor comprising:
one or more processing units to:
generate an augmented instance of sensor data generated using a sensor, wherein the augmented instance of the sensor data is generated based at least on a determination that a sensor data queue of an inferencing application executed using a deployed computing environment is empty, the sensor data queue for storing instances of the sensor data generated using the sensor; and transmit data representative of the augmented instance of the sensor data for storage using the sensor data queue.

19. The processor of claim 18, wherein the one or more processing units are further to:

receive second data representative of a request for an instance of sensor data generated using a sensor, wherein the generation of the augmented instance of the sensor data is based at least on the request.

20. The processor of claim 18, wherein the processor is comprised in at least one of:

a control system for an autonomous machine;

a system for performing simulation operations;

a system for generating or presenting at least one of virtual reality content or augmented reality content;

a system for performing deep learning operations;

a system incorporating one or more virtual machines (VMs);

a system implemented at least partially in a data center;

a system implemented at least partially using cloud computing resources; or a system for testing inferencing capability of a deployed computing environment.

\* \* \* \* \*